Jan. 10, 1950 G. B. HILL 2,493,918
HARVESTER WITH MEANS FOR CONVERSION
FROM CHOPPER TO WINDROWER
Original Filed March 7, 1941 2 Sheets-Sheet 1
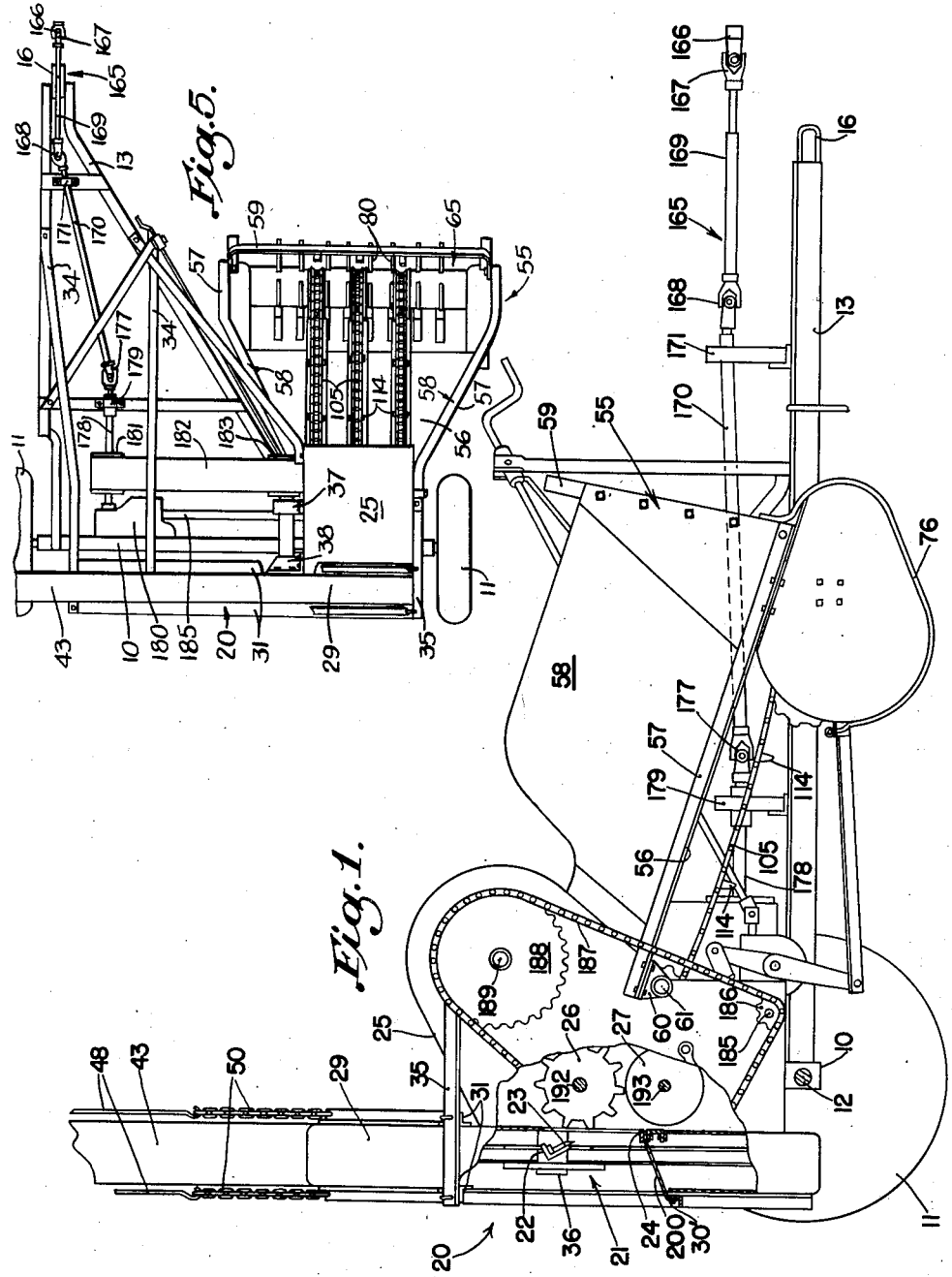
INVENTOR.
GEORGE B. HILL
BY
ATTORNEYS

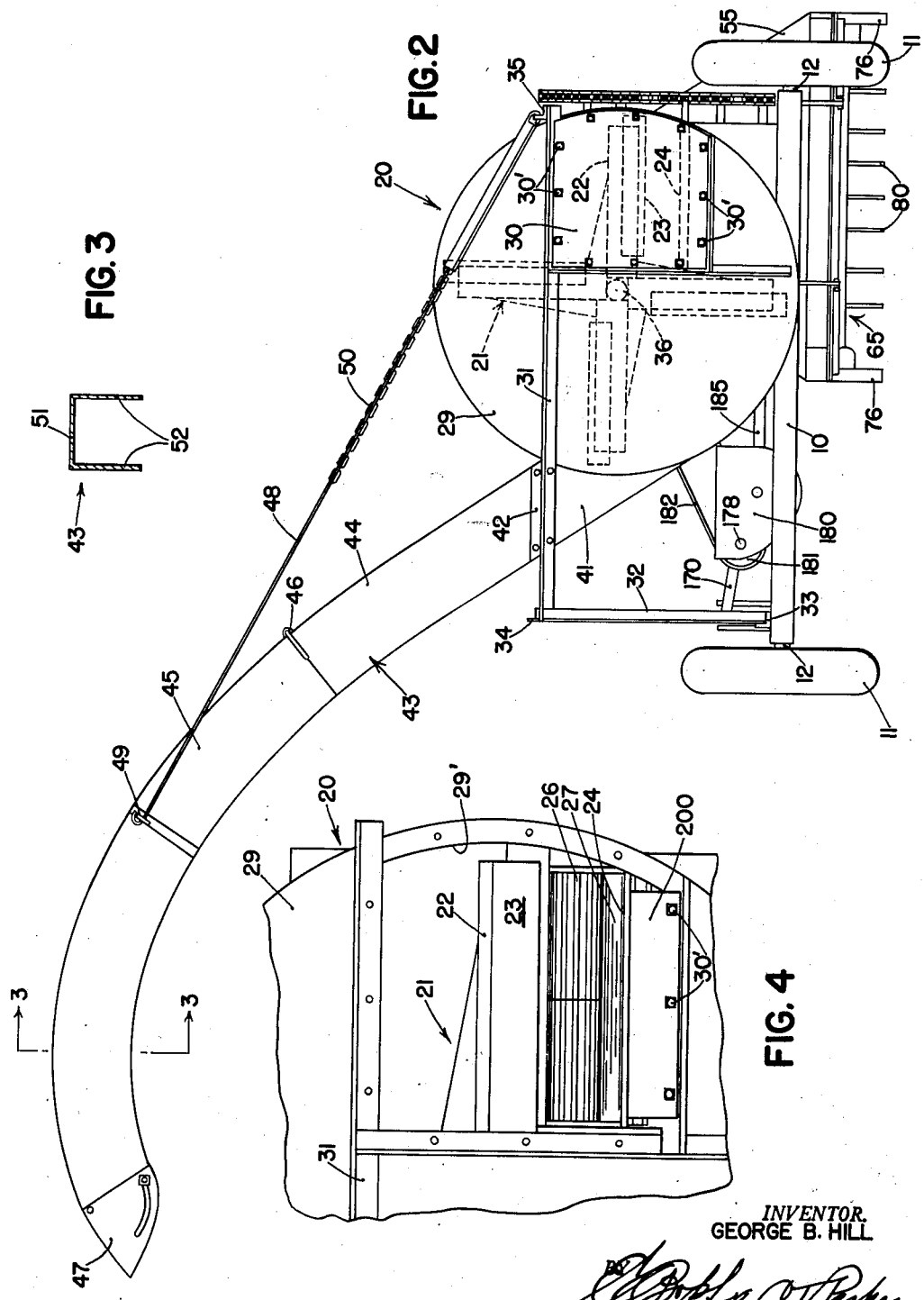

Patented Jan. 10, 1950

2,493,918

UNITED STATES PATENT OFFICE 2,493,918

HARVESTER WITH MEANS FOR CONVERSION FROM CHOPPER TO WINDROWER

George B. Hill, Ottumwa, Iowa, assignor to Deere Manufacturing Co., a corporation of Iowa Original application March 7, 1941, Serial No. 382,219. Divided and this application February 3, 1944, Serial No. 520,987

6 Claims. (Cl. 56—16)

The present invention relates generally to harvesters and more particularly to machines adapted to harvest, gather, and reduce to silage, green forage crops such as grass, alfalfa and the like, and has for its principal object the provision of a novel and improved harvester and chopper which is efficient in operation, simple in construction, but strong and durable. This application is a division of a co-pending application, Serial No. 382,219, filed March 7, 1941, now Patent No. 2,347,907, issued May 2, 1944.

Another object relates to the provision of a harvesting machine which can be quickly and easily converted from an ensilage harvester and chopper, which treats and loads the green crops immediately, to a windrow harvester which lays the green crops in windrows along the ground for purposes of curing and drying the crops.

These and other objects and advantages of my invention will be apparent to those skilled in the art after a consideration of the following description, in which reference is had to the drawings appended hereto, in which Figure 1 is a side elevational view of the harvester with a part of the housing broken away to show the interior arrangement when the machine is used as a windrow harvester.

Figure 2 is a rear elevational view of the harvesting machine, showing the arrangement of parts as used when the machine is operating as a green crop harvester and chopper.

Figure 3 is a sectional elevational view taken along a line 3—3 in Figure 2.

Figure 4 is a partial rear elevational view, drawn to an enlarged scale, showing the discharge opening in the rear of the housing when the machine is used as a windrow harvester.

Figure 5 is a top plan view of the machine drawn to a reduced scale, portions of which are broken away.

Referring now to the drawings, the harvesting machine has a mobile frame which includes a transversely disposed supporting axle beam 10, at opposite ends of which are disposed a pair of supporting wheels 11, respectively, journaled on a pair of stub axles 12 fixed to the main axle beam 10. A draft frame, indicated generally by reference numeral 13, extends forwardly from the main axle beam 10, to which it is rigidly connected, and is provided at its forward end with a tractor hitch member 16 adapted for connection to the drawbar of the tractor or other suitable draft mechanism. The draft frame 13 and axle beam 10 are rigidly connected together to form a unitary frame structure.

Supported at the rear of the draft frame is a material-receiving means in the form of an ensilage chopper 20 having a rotary knife element 21 of the flywheel type, comprising radially extending arms 22 on which are carried the chopping blades 23. The arms 22 are mounted on a shaft 36 which is journaled in suitable bearings 37, 38 disposed ahead of the flywheel 21. A detailed description of the flywheel chopper is not considered necessary here, for a chopper of this type is described and claimed in my Patent No. 2,313,872, granted March 16, 1943. The blades 23 cooperate with a stationary cutter bar 24 to chop the harvested crops which are fed thereto by means of suitable feeding mechanism including an upper fluted roll 26 and a smooth feed roll 27, disposed immediately ahead of the cutter bar 24 and enclosed in a feeder housing 25, which is mounted in fixed relation on the supporting frame.

The rotary chopper 21 is contained within a generally circular, vertically disposed housing 29, which is mounted behind the main axle beam 10 and communicates with the feeder housing 25 to admit the harvested crops to the cutter bar 24. The housing 29 is bolted to the rear edges of the feeder housing walls, and is further supported by a superstructure comprising a pair of transversely disposed frame members 31, fixed to the front and rear sides of the housing 29, respectively, and attached to a pair of vertical supporting members 32 which are carried at their lower ends on a forwardly extending frame member 33 which is fixed to the axle beam 10. The transverse frame members 31 are interconnected by a pair of longitudinally extending bracing beams 34, 35 on opposite ends of the superstructure, respectively.

The arms 22 of the rotor also serve as fan blades and provide means for propelling the chopped crops through a tangential discharge opening or duct 41, which extends upwardly and is offset laterally from the stubbleward side of the chopper housing 29. The discharge portion 41 of the housing 29 terminates at the transversely disposed frame members 31 and is provided with a connecting flange 42, to which is connected a discharge conduit 43 extending upwardly and outwardly in a parabolic curve which follows substantially the natural projectory of the crops as they are discharged from the housing 29 through the discharge passage 41.

The parabolic conduit 43 comprises a pair of sections 44, 45 coupled together by means of a hinge 46 which permits the upper section 45 to be folded back over the top of the rotary chopper housing 29 for transport purposes. The outer end of the conduit 43 is provided with a pivoted hood 47 for controlling the direction of discharge of the crops from the end of the conduit 43. The conduit 43 is closed on three sides, having a top wall 51 and a pair of side walls 52, but no bottom wall (Fig. 3). The bottom of the conduit 43 is open all the way from the connecting flange 42 to the outer end of the conduit. Thus the discharge conduit 43 serves more as a means for guiding the discharged crop material in its natural trajectory from the rotary chopper 20 to the wagon or truck which is drawn alongside of the harvester, rather than as a pneumatic conveyor pipe. In case the rotary chopper should slow down, the crop material discharged through the conduit would merely follow a lower trajectory curve rather than clogging the conduit and requiring the latter to be dismantled and cleaned out before any further harvesting could be done. I have found that when any shape of discharge conduit other than the parabolic curve described above is used, such as, for example, a straight inclined lower portion with an upper portion which follows a circular arc, the bottom wall of the conduit must be carried up farther than in the parabolic shape of conduit. The reason for this is obvious, since the crop material must be guided on all sides if an attempt is made to make it follow any other path than its natural trajectory, and when the bottom wall is carried up toward the upper end of the conduit, more difficulty is encountered from clogging of the conduit at such times as when the rotor slows down. Thus it is evident that by making the conduit 43 parabolic in form, the bottom wall can be left out entirely, right down to the discharge opening in the housing. This feature forms the subject matter of my U. S. Patent 2,431,477.

The conduit 43 is supported by a pair of tension members 48 connected between the bracing member 35 and a bracket 49 fixed to the outer section 45 of the conduit 43. Each of the supporting members 48 includes a section of flexible chain 50 which permits the outer section 45 to be swung about the hinge 46 for folding the section 45 over the top of the housing 29.

The harvested crops are gathered and conveyed to the feeder housing 25 by gathering means including a forwardly extending platform 55 which is pivotally mounted on the feeder housing 25 by means providing for vertical swinging movement relative thereto about a transversely extending axis. The platform 55 comprises a deck 56 carried on a pair of laterally spaced forwardly extending frame members 57, upon which are also supported a pair of forwardly diverging side walls 58. The forward ends of the frame members 57 are rigidly connected together by means of a vertically disposed arched frame member 59 which extends over the forward end of the platform. The rear ends of the frame members 57 are provided with bearing members 60 which are journaled at opposite ends of a transversely disposed shaft 61 which is carried in suitable bearings on the feeder housing 25. The forward end of the platform 55 is provided with a pair of laterally spaced skids or runners 76, between which is disposed a cylinder type pick-up device 65 having a plurality of crop engaging teeth or fingers 80 adapted to rotate with the rotary pick-up device 65 and pick severed crops from the ground and deposit them upon the deck 56 between the side walls 58, where the crops are moved rearwardly up the deck 56 of the platform 55 by means of suitable conveyor chains 105 having teeth 114 engageable with the crops and are crowded together between the side walls 57 and into the feeder housing 25.

Further description of the details of the pick-up and conveyor mechanism is not considered necessary here, for reference may be had to my above mentioned Patent 2,347,907 for a complete disclosure of such details.

Power to operate the mechanism on the implement is obtained from the power take-off shaft of the tractor which draws the implement, by means of a power shaft 165 comprising a splined sleeve member 166 adapted to be attached to the tractor power take-off shaft, and is connected through a pair of universal joints 167, 168 and a telescoping shaft section 169 to a shaft 170 journaled in a support 171. The shaft 170 is connected through a universal joint 177 to a power shaft section 178 from which power is taken to operate various parts of the mechanism. The power shaft section 178 is supported in a pedestal bearing 179 mounted on the draft frame 13 and extends rearwardly therefrom into a gear housing 180. A belt pulley 181 is mounted on the shaft section 178 and is connected by a driving belt 182 to a pulley 183 mounted on the forward end of the rotor shaft 36. The rear end of the shaft section 178 is journaled in the gear housing 180 and is connected by suitable gears (not shown) in the housing 180 to a transversely extending power shaft 185. The shaft 185 extends under the feeder housing 25 and a sprocket 186 is mounted on the end of the shaft 185 which projects beyond the feeder housing. The sprocket 186 drives through a chain 187, which is trained over a large diameter sprocket 188 fixed to the shaft 189 of a feeder (not shown) in the form of a beater of any suitable conventional design for engaging the crops which move upwardly on the platform and directing them to the rotary chopper 20. The chain 187 is also trained around a pair of sprockets (not shown) fixed on a pair of shafts 192, 193, respectively, on which are mounted the rollers 26 and 27, respectively. Further details of this drive connection may be had by reference to Patent 2,347,907 mentioned above.

In operation as an ensilage harvester, the machine is attached to a tractor and the power connection 166 is connected to the power take-off shaft of the tractor. The tractor then draws the machine through a field of alfalfa or other silage crops, which have already been cut by a mower, and the fingers 80 of the pick-up mechanism 65 raise the crops to the platform 56 and are conveyed upwardly and rearwardly in a generally defined path along the deck 56 by the chains 105 and delivered to the feed rollers 26, 27, which continue to feed the green crops along said path to the flywheel cutter 21. The crops are then intercepted and chopped and are thrown by centrifugal force upwardly and outwardly through the parabolic conduit 43 and are delivered to a truck or wagon which is being drawn alongside the ensilage harvester.

At times, it is desirable to cut the crop, lay it in a windrow, and allow it to dry or at least to wilt before it is chopped. Although windrowing machines are available which cut a swath and convey it laterally for discharge into a windrow, a machine embodying my invention can be drawn over the field after an ordinary mower, to gather the cut crop into windrows, which can later be picked up and chopped. For this purpose, the power transmitting belt 182 is removed from the pulley 181 to prevent the flywheel from rotating during operation, thus providing a connectible and disconnectible drive means for the flywheel; and a rear housing panel in the form of a closure or cover 30 is removed from the rear of the flywheel housing 29, by removing a number of bolts 30', leaving a discharge opening 29' in the rear wall of the housing directly behind the feed rolls 26, 27 and cutter bar 24, or in the path of feeding of material rearwardly. The flywheel cutter 21 is then set with the arms 22 in the position shown in the drawings, in which position the cutter can be suitably blocked, if necessary. The machine is then run over the field, picking up the crop and raising it to the feed rolls, which discharge the crop through the rear opening 29'. Although the feed rolls 26, 27 discharge the crop with sufficient force to clear the lower edge of the opening 29', preferably a sheet metal apron 200 is secured to the lower edge of the opening 29' by means of a few of the bolts 30' which are replaced to hold the apron 200 in position. The apron extends from the edge of the opening 29' forwardly to the cutter bar 24 and is inserted beneath the latter to hold the apron 200 in proper position. The rearward and downward slope of the apron 200 not only prevents any material from dropping into the housing 29, but discharges any such material over the rear edge of the opening 29'. Since the opening 29' is appreciably narrower than the width of the front of the platform, the crop will be discharged in a windrow, which can be picked up and chopped in another operation, after the crop is suitably cured. The same machine can be used for the subsequent operation, after the apron 200 has been removed and the belt 182 and panel 30 replaced in normal position. Thus, by incorporating the windrowing feature in this machine, I have eliminated the necessity for a farmer having an ordinary mower to purchase either a windrower or a side delivery rake.

I claim:

1. A harvester comprising a mobile frame, a forwardly extending platform supported thereon, means on said platform for gathering crops and conveying the same rearwardly thereon, said platform having a throat at the rear thereof of restricted width through which said crops are discharged, feeding means for receiving said crops and feeding them rearwardly, a chopper housing behind said feeding means, a rotary chopper in said housing for chopping said crops, a power shaft connected to said crop gathering and conveying means for driving the latter, disconnectible means for driving said chopper from said power shaft, and a removable panel in the rear wall of said chopper housing in register with said feed means.

2. A harvesting machine comprising a mobile frame, crop gathering means for raising severed crops and including means for crowding said crops together to restrict the width of the stream of harvested material, a chopper housing supported on said frame and to which said material is delivered, a pair of upper and lower feed rolls for feeding said material into said chopper housing, a rotary chopper in said housing, a power shaft connected to said crop gathering means for driving the latter, means for driving said chopper from said power shaft, said chopper driving means being disconnectible, and a panel in the rear wall of said housing in register with said feed rolls, said panel being removable when said chopper is disconnected to permit said feed rolls to discharge said crop material in a windrow on the ground behind said machine.

3. A harvesting machine comprising a mobile frame, a feeder housing carried thereon and having a discharge throat in the rear wall thereof, a chopper housing supported on said feeder housing, and a removable panel in the rear wall of said chopper housing in register with said discharge throat.

4. A harvesting machine comprising a mobile frame, a forwardly extending platform including crop gathering and conveying mechanism associated therewith for elevating and crowding harvested material to a restricted width, feed rolls disposed in said feeder housing, a rotary chopper disposed behind said feed rolls and adapted to receive crop material therefrom, and a housing for said chopper supported on said feeder housing and overhanging behind said frame, said housing having a removable panel in the rear wall thereof in register with said feed rolls through which the latter can discharge harvested material when the panel is removed.

5. A harvesting machine comprising a mobile frame, a feeder housing carried thereon and having a discharge throat in the rear wall thereof, a chopper housing disposed behind said feeder housing and having an opening in the rear wall in register with said discharge throat, and an apron adapted for connection to said housing and to extend from said rear wall toward said discharge throat to prevent material from dropping into the chopper housing.

6. A harvesting machine comprising a mobile frame, crop gathering means including means for crowding the crops together to reduce the width of the stream of harvested material, a crop treating housing supported on said frame to which said material is delivered, means for feeding said material into said housing, said housing having a discharge opening in the wall thereof opposite to and in register with said feed roll means, through which opening said material can be discharged by said roll means to form a windrow on the ground, and a panel having means for securing the same over said opening to retain the material optionally within said housing.

GEORGE B. HILL.

REFERENCES CITED

The following references are of record in the file of this patent:

UNITED STATES PATENTS

| Number | Name | Date |
|---|---|---|
| 733,289 | Silver | July 7, 1903 |
| 826,459 | Wilder | July 17, 1906 |
| 1,170,616 | Dintaman | Feb. 8, 1916 |
| 1,173,238 | Youmans | Feb. 29, 1916 |
| 1,303,352 | Merwin | May 13, 1919 |
| 1,799,306 | Mainland | Apr. 7, 1931 |
| 1,901,092 | Fisk | Mar. 14, 1933 |
| 2,114,580 | Thompson | Apr. 19, 1938 |
| 2,253,633 | Lindly | Aug. 26, 1941 |
| 2,253,794 | Lindholm | Aug. 26, 1941 |
| 2,347,907 | Hill | May 2, 1944 |
| 2,349,386 | Stoetzl et al. | May 23, 1944 |
| 2,431,477 | Hill | Nov. 25, 1947 |